United States Patent

Koga et al.

[11] Patent Number: 5,819,077
[45] Date of Patent: Oct. 6, 1998

[54] GRAPHICS DRAWING SYSTEM AND METHOD BASED ON A CLIENT SERVER SYSTEM HAVING SHARED GRAPHICS RESOURCES

[75] Inventors: Kazuyoshi Koga, Katsuta; Ryo Fujita; Katsunori Suzuki, both of Hitachi; Shoji Nakamura, Yokohama; Toshiyuki Kuwana; Hideki Fujii, both of Hitachi, all of Japan

[73] Assignee: Hitachi, Ltd., Tokyo, Japan

[21] Appl. No.: 620,225

[22] Filed: Mar. 22, 1996

Related U.S. Application Data

[63] Continuation of Ser. No. 238,449, May 5, 1994, abandoned.

[30] Foreign Application Priority Data

May 10, 1993 [JP] Japan ................................. 5-108307

[51] Int. Cl.⁶ ........................................................ G06F 9/00
[52] U.S. Cl. ..................... 395/561; 395/200.33; 345/418
[58] Field of Search .............................. 395/561, 200.33, 395/200.55, 200.56, 200.59; 364/134; 345/418

[56] References Cited

U.S. PATENT DOCUMENTS

| 4,928,247 | 5/1990 | Doyle et al. | 395/160 |
| 5,289,574 | 2/1994 | Sawyer | 395/157 |
| 5,321,808 | 6/1994 | Rupp | 395/164 |

OTHER PUBLICATIONS

PEX: A Network—Transparent 3D Graphics System, by Nishimoto et al, IEEE publication pp. 14–26.
A Critical Evaluation of PEX, by Kubitz et al, IEEE 1990 publication, pp. 65–75.

*Primary Examiner*—William M. Treat
*Assistant Examiner*—Zarni Maung
*Attorney, Agent, or Firm*—Antonelli, Terry, Stout & Kraus, LLP

[57] ABSTRACT

A graphics system utilizes the graphics standardization specification PEX for providing high-speed drawing when a client and a server locally operate on the same machine and allow an application to change structure and graphics attributes defined by another application without being aware of the distinction between local and remote cases.

25 Claims, 5 Drawing Sheets

FIG. 1 SCHEMATIC DIAGRAM OF GRAPHICS SYSTEM IN CLIENT SERVER MODEL

FIG. 2  FLOWCHART OF SCHEMATIC PROCESSING PROCEDURE OF LOWER GRAPHICS LIBRARY

BLOCK DIAGRAM OF GRAPHICS RENDERING PROCESSOR

FIG. 5

EXAMPLE PROGRAM OF THE LOWER GRAPHICS LIBRARY

| | |
|---|---|
| 1101 | GCreateGC |
| 1102 | GCreateGC |
| 1103 | GCreateGeometryP |
| | |
| 1104 | GBeginGeometryP |
| 1105 |   GSetLineColor |
| 1106 |   GPolyLine |
| 1107 |   GPolyLine |
| ... | ... |
| 1112 | GEndGeometryP |
| | |
| 1113 | GCreateStructure |
| 1114 |   GSetLineColor |
| 1115 |   GPolyLine |
| 1116 |   GFillArea |
| ... | ... |
| | |
| 1121 | GBeginGeometryP |
| 1122 |   GSetLineColor |
| 1123 |   GPolyLine |
| 1124 |   GExecStructure |
| 1125 |   GSetLineColor |
| 1126 |   GPolyLine |
| ... | ... |
| | |
| 1131 | GPushGC |
| 1132 | GChangeGC |
| 1133 | GFillArea |
| 1134 | GFillArea |
| 1135 | GFillArea |
| 1136 | GPopGC |
| 1137 | GPolyLine |
| ... | ... |
| | |
| 1142 | GEndGeometryP |
| | |
| 1143 | GFreeGeometryP |
| 1144 | GDestroyGC |
| 1145 | GDestroyGC |

GRAPHICS DRAWING SYSTEM AND METHOD BASED ON A CLIENT SERVER SYSTEM HAVING SHARED GRAPHICS RESOURCES

This application is a continuation of application Ser. No. 08/238,449, filed on May 5, 1994, now abandoned.

BACKGROUND OF THE INVENTION

The present invention relates to a computer graphics system, such as client server model to be realized in a network-transparent environment and, more particularly, to a graphics drawing method based on graphics standardization specification PEX and an apparatus for implementing such a method.

For a graphics system for use on client server model, there is an "X-Windows System" for example as introduced in the UNIX MAGAZINE, March 1988, pp 55 to 62. In the client machine an application creates graphics commands by calling some graphics functions of graphics library. Then, the client machine performs communications process on these commands to send them to the server machine as a communications protocol. The server machine receives the communications protocol, performs graphics processing accordingly, and displays a processing result on a server monitor.

Known as one of three dimension graphics standardization specifications is a "PEX Introduction and Overview Version 3.2" by MIT Laboratory for Computer Science, October 1988. In this PEX specification, an application holds graphics commands for drawing in a structure hierarchically. In drawing, the structure is traversed to create the graphics commands. The structure is held in either client machine (application) or server machine. It is better to hold the structure in server, in order to share resource structure between some application. PEX standard defined three subsets of PEX features, immediate mode, structure mode and PHIGS Workstation mode. Application program in the all mode (includes immediate mode) can execute some existing structures.

Essentially, the immediate mode is used more often in a stand-alone model rather than in a server-client model. In a stand-alone model, an application process for issuing graphics commands and a graphics process for performing graphics processing is operated on a same machine. Since both the processes are operated on the same machine, there is no need for a communication process, such as the creation and interpretation of a communications protocol.

In the client server model, however, the above mentioned method in which a communication process is performed is employed also in the immediate mode in order to provide the same application interface.

The client server model is advantageous for a user ( who makes an application program) in that an application can be developed without distinguishing between a remote case and local case. The remote case is a case in which a client machine and server machine are different machines. The local case is a case in which the client and the server machine are the same machine.

However, the client server model presents a problem in that, in the local case where the client and the server operates on the same machine, essentially unnecessary communications processing, such as generating a communications protocol and receiving it, occurs, thereby deteriorating its performance as compared with the stand-alone model. This problem can be solved by providing a constitution in which, when the client and the server are on the same machine, without a communication process, the application process in the client performs drawing processing directly, as disclosed in Japanese Non-examined Patent Publication No. 4-142674. However, this prior-art technology does not consider the graphics standardization specification PEX and therefore does not present a solution to handle a problem of how to resource structure, such as how to hold and edit the structure.

SUMMARY OF THE INVENTION

It is therefore an objective of the present invention to provide a graphics system based on the graphics client server model having a graphics structure mechanism that prevents a performance degradation from occurring in the above-mentioned local case.

The above-mentioned objective is achieved by providing a constitution in which an application program accesses a routine for directly performing graphics processing without invoking a communication process in the local case, in addition to the previous routine for a remote case, and controlling graphics resources with a communication process.

In addition to above mentioned constitution, there is provided a graphics drawing method for holding a graphics resource (structure, graphics context and so on) at one place. And, at the beginning of graphics command function processing in a local case, determining whether a graphics command function is the function of editing the graphics resource. If it is, a routine for the remote case and for controlling a graphics resource with a communication process is accessed. If not (called an output command), a routine for directly performing graphics processing without a communication process is accessed.

The graphics context as referred to herein indicates a set of attributes, including attributes of graphics to be drawn and environmental attributes for graphics processing. The graphics attributes are a color in which a drawing is made and a draw area, for example. The graphics context is hereinafter referred to also as GC.

In the local case, output commands access a routine for directly performing graphics processing without resorting to communication processing, thereby bypassing wasted processing and enhancing the drawing processing speed. And, a command of the remote case, or an editing command for a graphics resource in the local case, accesses a route for performing graphics processing with a communication process, thereby sharing the graphics resource between plural some applications.

BRIEF DESCRIPTION OF THE DRAWINGS

FIG. 5 is a diagram illustrating an example of a program of the lower graphics library.

DETAILED DESCRIPTION OF PREFERRED EMBODIMENTS

This invention will be described in further detail by way of example with reference to the accompanying drawings.

Figure 1:
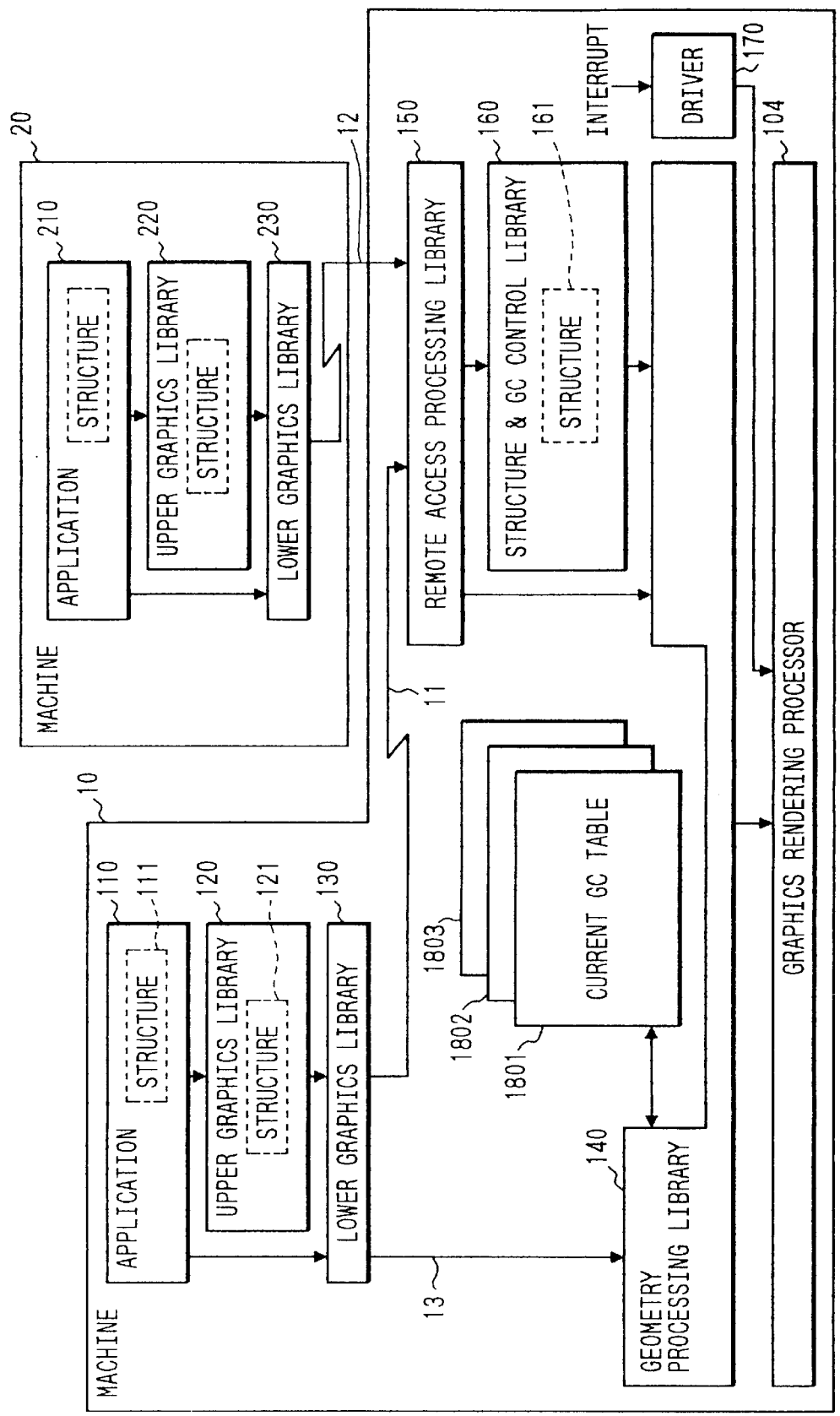
FIG. 1 is a schematic diagram illustrating a graphics system in a client server model associated with one preferred embodiment of the invention.

FIG. 1 is schematic diagram of a graphics system based on a client server model forming one preferred embodiment of the present invention, the graphics system consisting of a machine 10 and a machine 20, for example. An internal constitution of the machine 10 is as follows. An application 110 creates a graphics command to issue a function of a graphics library. There are two types of graphics libraries: a lower graphics library 130 consisting of basic functions and an upper graphics library 120 containing functions composed of combinations of the basic functions. For example, a "fill" command is contained in the lower graphics library 130 and a "sphere" command and a "triangular pyramid" that can include the "fill" command are contained in the upper graphics library 120. In the upper graphics library 120, a received graphics function is divided into a basic function to call a corresponding function from the low-order graphics library 130.

The lower graphics library 130 determines whether the command concerned directly calls a function from a geometry processing library 140 via path 13 or performs communication processing over path 11 to transfer, as a communication protocol, data to a remote access processing library 150. This determination processing will be described later with reference to FIG. 2.

The geometry processing library 140 performs a geometric calculation necessary for a specified graphic drawing. For example, the library 140 performs geometric calculations (geometry processing), such as coordinate transformation of some vertex position of a graphics object from modeling coordinates to device coordinates, calculation of a normal vector of a graphics vertex, and a luminance calculation for calculating luminance from light source information and a viewpoint position. Then, the geometry processing library 140 sends the position of a device coordinate system and a luminance value to a graphics rendering processor 104. Such attributes necessary for the geometric processing as light information and viewpoint position are held in a current GC table 1801. The geometry processing library 140 performs the geometric processing while referencing the current GC table 1801.

The graphics rendering processor 104 interpolates the position information and luminance information of the graphics vertex to obtain position information and a luminance value of each pixel in the graphic data and displays a result on the monitor.

On the other hand, the remote access processing library 150, having received the drawing command from the lower graphics library 130, interprets the communications protocol coming through the communication processing path 11 and, if it is a setting or editing command for a structure or graphics context, sends it to a structure & GC control library 160. The structure & GC control library 160 holds and controls the structure and several graphics contexts. When updating a current graphics context or redrawing the structure, the structure & GC control library 160 calls a corresponding function from the geometry processing library 140.

The current GC table 1801 holds the values of a graphics environment to be referenced when performing graphics geometry processing. For example, this table contains data identifying colors of graphics to be drawn, conversion matrix coefficients necessary for coordinate conversion, and drawing areas. One application has only one current GC table. However, in a multi-process environment in which a plurality of applications concurrently operate on time sharing basis there are a plurality of current GC tables (1801, 1802 and 1803) for these applications.

The geometry processing library 140 can deal with the multi-process environment by switching the current GC tables (1801, 1802 and 1803) by dynamic link. When a process switching occurs, an interrupt signal is issued to a graphics driver. The graphics driver 170 switches the attributes of the graphics rendering processor 104 and the current GC table 1801 to another current GC table 1802.

The application 110, the lower graphics library 130 and the geometry processing library 140, when passing along the path 13, perform processing data by calling functions in each layer, so that the processing is performed in the same process. On the other hand, when they send data along the path 11, the application 110 and the lower graphics library 130 share same process, while the remote access processing library 150, the structure & GC control library 160 and the geometry processing library 140 operate in another process.

Structures are held in the configuration of FIG. 1 in three layers as follows:

(1) structure 111 held in the application 110;

(2) structure 121 held in the upper graphics library 120; and (3) structure 161 held in the structure & GC control library 160.

The structures of (1) and (2) are held on the client side, while the structure (3) is held on the server side. It is necessary to have such a variation in order to cope with a variety of applications and a variety of server machines of different types.

Now, data processing in the remote case will be outlined as follows.

Referring to FIG. 1, an application 120 generates a graphics command in the machine 20 to be transferred to a lower graphics library 230. Since a drawing area is not in its own machine 20, the lower graphics library 230 transfers the graphics command as a communications protocol to the machine 10 via the path 12 through communication processing.

In the machine 10, the remote access processing library 150 receives the communications protocol coming from the machine 20.

The remote access processing library 150 interprets the communications protocol received through communication processing; and, if it is a setting or editing command for a structure or graphics context, it calls a corresponding function from the structure & GC control library 160. If it is a drawing command, the remote access processing library directly calls a function from the geometry processing library 140.

Figure 2:
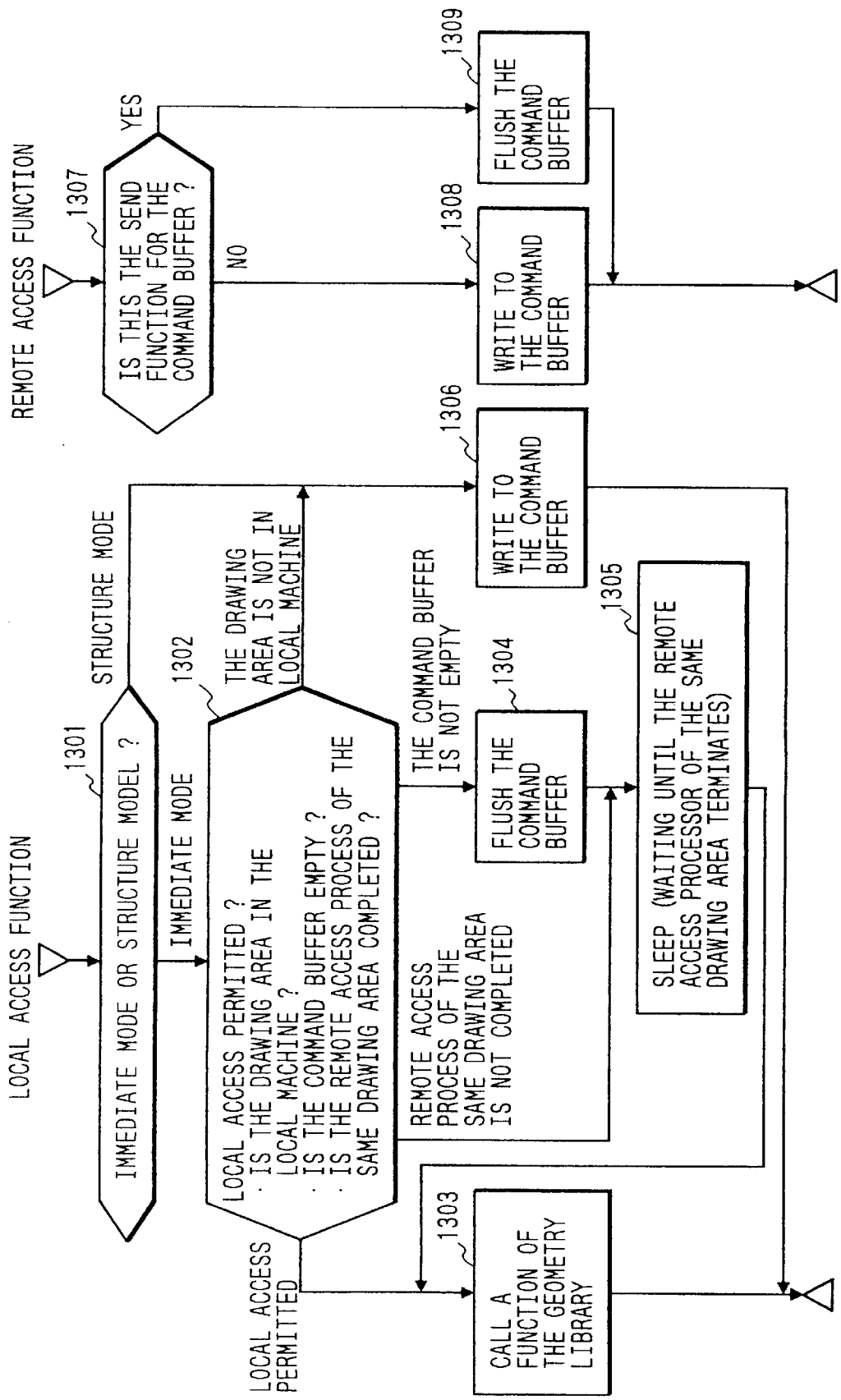
FIG. 2 is a flowchart of a general processing procedure of the lower graphics library of FIG. 1.

FIG. 2 is a flowchart indicating an outline of a processing procedure of the lower graphics library 130. Functions contained in this library are classified into remote access functions and local access functions. The classification will be detailed later.

For a remote access function, a determination is first made as to whether its command is a send function for a command buffer (step 1307); and, if it is a send function, processing goes on to step 1309, flushing the command buffer. If the command is not a send function, processing goes on to step 1308, and the command is written to the command buffer. If there is no empty area in the buffer, the command buffer is flushed once and the command is set to the emptied command buffer.

For a local access function, a distinction between immediate mode and structure mode is first made in step 1301. If it is the structure mode, the command is set to a command buffer in step 1306.

In the immediate mode, it is checked in step 1302 if it is allowed to make local access in step 1301. Conditions for the local access include (1) the drawing area is a local machine, (2) the command buffer is empty, and (3) a remote access to a same drawing area has been completed. These conditions can be represented by means flags, so that they can be checked easily in step 1302. As a result, if it is found that the local access is allowed, a function calls from the geometry processing library in step 1303. If the drawing area is not in a local machine, processing goes on to step 1306.

If the command buffer is not found empty in step 1302, the processing goes on to step 1304 to send the command buffer and in step 1305 waits, in sleep mode, for the command buffer processing to terminate. When the remote access process of the same drawing area for the command buffer has terminated, the processing goes on to step 1303.

If, in step 1302, it is found that the process of the remote access to the same drawing area is not terminated, the processing goes on to step 1305.

Figure 3:
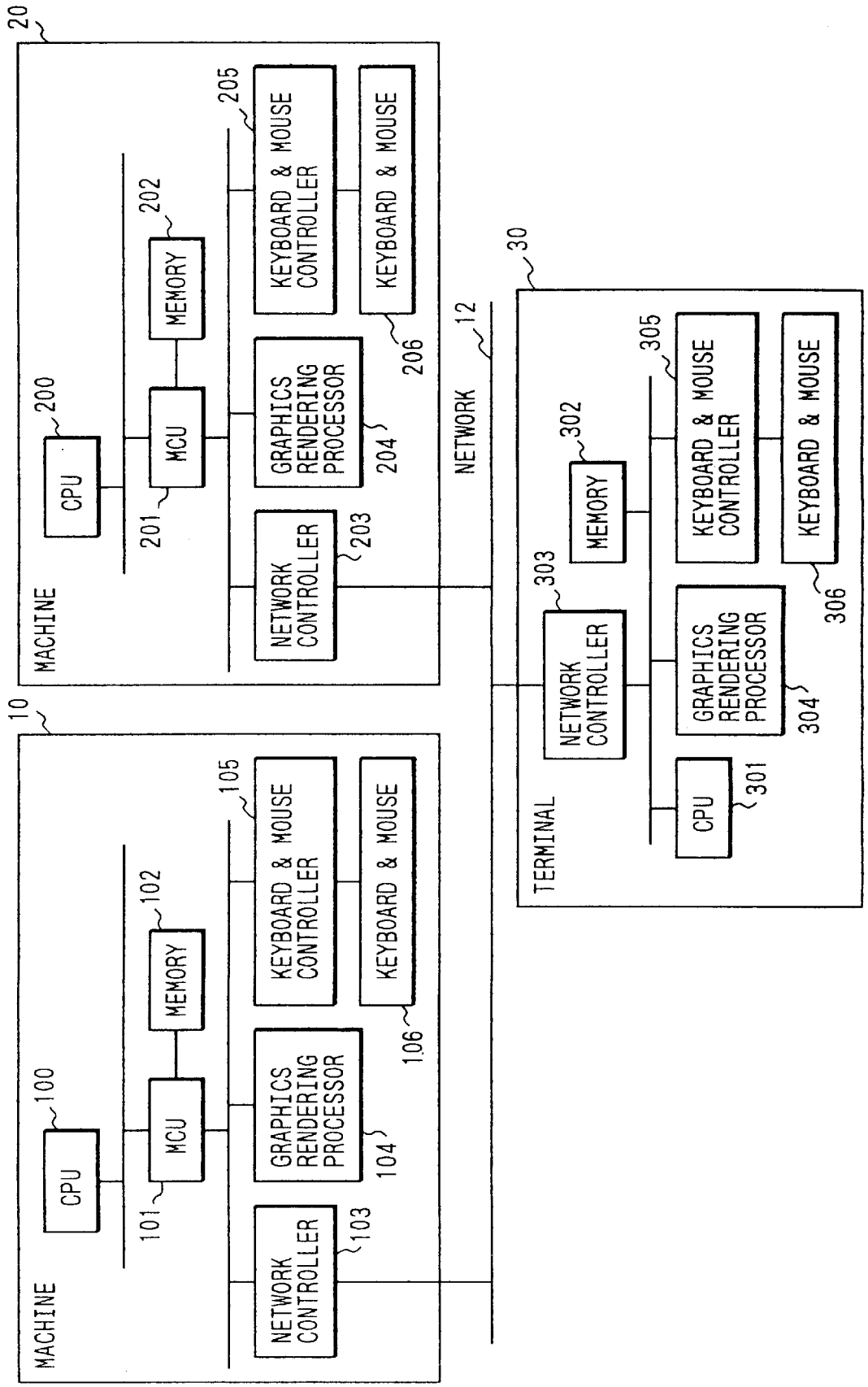
FIG. 3 is a hardware block diagram illustrating the graphics system of FIG. 1.

FIG. 3 is a hardware block diagram illustrating a graphics system for implementing the graphics system of FIG. 1.

Referring to FIG. 3, a network system consists of a machine 10, a machine 20 and a terminal 30 interconnected by a network 12, for example.

The machine 10 is composed of a CPU 100, an MCU 101, a memory 102, a graphics rendering processor 104, a keyboard and mouse controller 105, a keyboard and mouse 106 and a network controller 103. The CPU 100 controls processing of the application 110, the upper graphics library 120, the lower graphics library 130, the geometry processing library 140 the remote access processing library 150, and the structure & GC control library 160 of FIG. 1.

The network controller 103 operates when transferring the communications protocol with other machines via the network 12.

The terminal 30 is composed of a CPU 301, a network controller 303, a memory 302, a graphics rendering processor 304, keyboard and mouse controller 305 and keyboard and mouse 306.

With the above-mentioned graphics system, the following combinations of machines serving as a client and a server are possible:

(1) the machine 10 serves as a client and a server;
(2) The machine 20 serves as a client and the machine 10 serves as a server; and
(3) the machine 10 serves as a client and the terminal 30 serves as a server.

Figure 4:
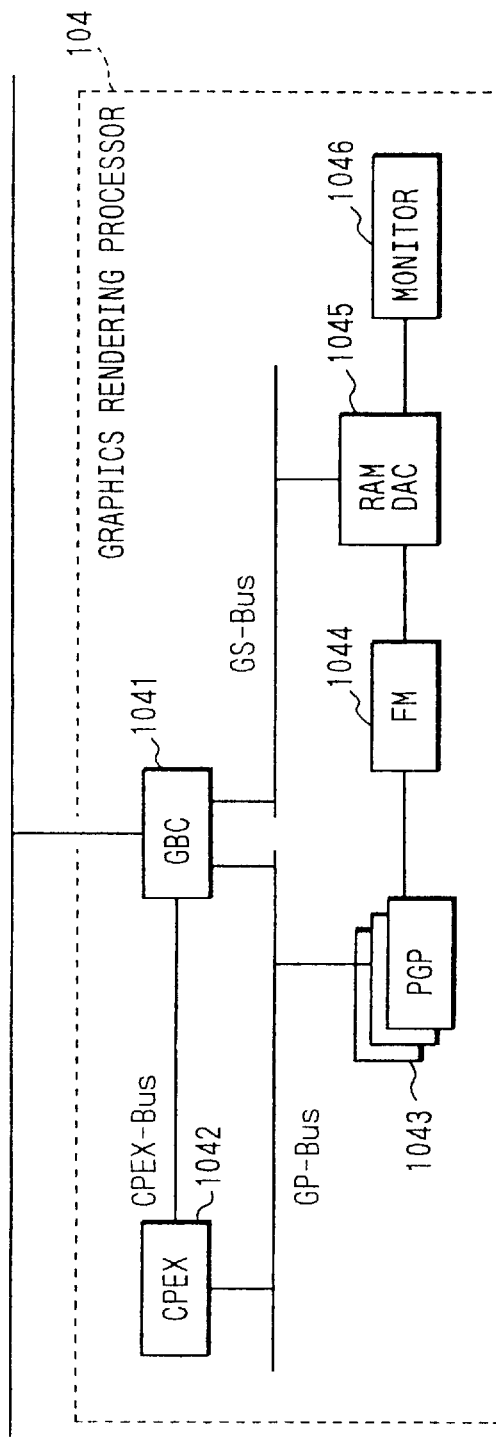
FIG. 4 is a block diagram illustrating the graphics rendering processor of FIG. 3.

FIG. 4 is a block diagram of the graphics rendering processor 104. The graphic rendering processor 104 is composed of a GBC 1041, a CPEX processor 1042, a PGP processor 1043, a frame memory FM 1044, a RAM DAC 1045 and a monitor 1046. The GBC 1041 interfaces an external bus to which the rendering processor is connected, thereby controlling an internal bus. Data sent from the external bus is received by the GBC 1041 and, if it is found to be a drawing command, the command is sent to a register of the PGP 1043. The PGP 1043 is a processor for generating one pixel by one pixel and sets generated pixels to the FM 1044. The FM 1044 is a frame memory for storing in a bit map format the pixels to be displayed on the monitor. The RAM DAC 1045 reads the pixels from the FM 1044 and sends them to the monitor 1046 via the monitor interface.

The CPEX 1042 is a processor for compressing and expanding image data; that is, this CPEX 1042 compresses the image data stored in the FM 1044 to send the compressed image data to the external bus and expands compressed image data coming from the external bus into the frame memory. The CPEX 1042 is hardware effective for transfer (GSendPicturewithComp function listed in Table 1 to be described) of the compressed image data over the network.

Now, a flow of the processing in the preferred embodiment of the invention will be described by using a sample coding using functions of actual graphics libraries.

Table 1 Lists typical functions of the lower graphics library.

TABLE 1

Classification of Funtions

| Classification | Example of Typical Funtions | |
| --- | --- | --- |
| Geometry processor control function | GCreateGeometryP GFreeBeometryP GBeginGeometryP | GEndGeometryP . . . |
| Graphics attribute function | GSetLineColor GSetLineWidth . . . | |
| Graphics drawing function | GPolyline GFillArea . . . | |
| Structure function | GCreateStructure GExecStructure GDestroyStructure | . . . |
| GC control function | GCreateGC GChangeGC GDestroyGC | GPushGC GPopGC . . . |
| Pick function | GBeginPick GEndPick . . . | |
| Other functions | GFlushCommandBuf GSendPicture GGetPicture | GSendPicturewithComp |

The geometry processor control functions include the GCreateGeometryP function for newly creating a geometry processor, the GFreeGeometryP function for freeing the already defined geometry processor, the GBeginGeometryP function for indicating the beginning of an immediate mode, and the GEndGeometryP function for indicating the end of an immediate mode.

The graphics attribute functions include the GSetLineColor function for designating a line color and the GSetLineWidth function for designating a line width.

The graphics drawing functions include the GPolyLine function for drawing a polygonal line and the GFillArea function for drawing a filled polygon.

The structure functions include the GCreateStructure function for indicating the start of structure creation, the GExecStructure function for traversing and drawing a defined structure, and the GDestroyStructure function for discarding a defined structure.

The GC control functions include the GCreateGC function for creating a graphics context, the GChangeGC function for changing a current GC with a defined GC, the GDestroyGC function for discarding a defined GC, the GPushGC function for pushing a current GC, and the GPopGC function for popping a pushed GC.

The pick functions include the GBeginPick function for indicating the beginning of a pick mode and the GEndPick function for indicating the end of a pick mode.

The other functions include the GFlushCommandBuf function for flushing, by forcible sending to a server, a command buffer in which data is temporarily stored during communication processing, the GSendPicture function for sending image data, the GGetPicture function for getting image data, and the GSendPicturewithComp function for compressing and sending image data.

Of the above-mentioned functions, the functions effective in the immediate mode are the graphics attribute functions, the graphics drawing functions, the GC control functions, and such functions that only draw an already defined structure as the GExecStructure.

The local access functions are graphics attribute functions and graphics drawing functions; the other functions are for remote accessing.

FIG. 5 shows an example of a program of a lower graphics library, in which the structure mode and the immediate mode exist together.

The GCreateGCs on lines 1101 and 1102 newly create graphics contexts. The graphics contexts are distinguished by their IDs returned by the functions. Then, the GCreateGeometyP is issued at line 1103 to map the geometry processor for using the geometry processing library to execute this application.

At line 1104, the immediate mode is instructed to start. This function sets a status flag internal to the lower geometry processing library in order to make the determination of step 1301 of FIG. 2. The graphics attribute function at line 1105 rewrites a line color value in the current GC 1801 in the functions of the geometry processing library via the path 13. The drawing functions at lines 1106 and 1107 perform geometrical conversion in the geometry processing library 140 via the path 13 to send resultant data to the graphics rendering processor. Upon completion of the drawing, the functions at lines 1106 and 1107 are not stored in the lower graphics library 130 and the geometry processing library.

The function at line 1113 is a structure mode designating function. The GCreateStructure returns, as its return value, the ID of a structure to be created. The GCreateStructure resets the flag of the immediate mode set by the function at line 1104 located in the lower graphics library to the structure mode. Then, the GCreateStructure sets its command to the command buffer. Further, the GCreateStructure sets the drawing and attribute commands at lines 1114 through 1116 to the command buffer.

Line 1121 is the function for specifying the immediate mode again. Here, the flag is set to the immediate mode again. Line 1122 is an attribute function. However, since the command is held in the command buffer, processing goes on to step 1304 of FIG. 2 to send the command buffer. When the structure is set in the structure & GC control library 160, a line color of the current GC table 1801 is changed. Line 1123 draws a line in the same way as line 1106. At line 1124, sets the command to the command buffer because the command traverse and draw an already defined structure. When the function at line 1125 is executed, the command buffer is sent because the command buffer has data.

Upon receiving the GExecStructure, the structure & GC control library first stores in it all of the contents of the current GC table 1801 to initialize the table 1801. Then, the structure & GC control library 160 searches for an entered structure and calls commands in the structure one by one by functions of the geometry processing library 140. If this structure is a structure defined at line 1113, the line color of the current GC table 1801 in the geometry processing library are changed and a line and a fill area is drawn. When a series of structures has been drawn, the graphics context saved at the beginning of the structure drawing is set to the current GC table 1801.

When the remote access processing has been terminated, as mentioned above, the function at line 1125 is executed.

The functions at lines 1131 and 1132 are remote access functions, so that they are processed in the geometry processing library 140 via the path 11 and the structure & GC control library 160.

Line 1142 indicates an end of the immediate mode and frees the geometry processing library 140 of the ID designated by line 1143.

At lines 1144 and 1145, the defined graphics context is freed. The GDestroyGC function is realized when the structure & GC control library 160 frees the corresponding GC stored in it.

According to the above-mentioned embodiment, a high-speed drawing as practiced in a stand-alone model can be realized in the client server model computing environment especially if the client and the server operate both on a local, same machine, without performance degradation due to the communication process. In the novel constitution, the graphics resources (the graphics contexts and structures and so on) are held in one location, so that different applications can use these graphics contexts and structures from either of the local and remote cases. Additionally, an application can at any time change the contents of a graphics context and a structure without being aware of the case in which it is operating.

As described and according to the invention, there is provided a graphics system employing the graphics standardization specification PEX that, if a client and a server operate on a local, same machine, provides high-speed drawing similar to a stand-alone model and allows an application to change the contents of the GC tables and structures without being aware of a distinction between local and remote cases, thereby enhancing the ease of use of the graphics system.

What is claimed:

1. A graphics drawing method based on a client server model comprising the steps of:

sharing a graphics resource defined by one application in a first machine with another application in a second machine;

performing application processing and graphics drawing processing in a local case along a first path in said first machine; and sending a graphics command from said one application along a second path in said first machine to perform managing of said graphics resource;

wherein said graphics resource is held in one area in the first machine.

2. A graphics drawing method according to claim 1, wherein said graphics command provided along said second path includes a graphics resource editing command to edit said graphics resource by said one application in said first machine.

3. A graphics drawing method according to claim 1, further comprising accessing communication processing to control the graphics resource when said graphics command is provided on said second path.

4. A graphics drawing method according to claim 1, wherein the graphics resource is not held in the second machine.

5. A graphics drawing method according to claim 1, wherein performing said application processing and graphics drawing processing in a local case are done by reference to said graphics resource.

6. A graphics drawing method based on a client server model having editing and drawing commands for a structure for hierarchically holding graphics commands, control drawing commands for a graphics context for holding a set of graphics attributes and environments, and drawing commands, said graphics drawing method comprising the steps of:

using, in a first machine, a remote access process library for performing a communication process on a drawing command coming from a second machine;

using, in said first machine, a structure and graphics context control library for performing graphics context control and structure control;

using, in said first machine, a geometry processing library or performing a graphics process; and using, in said first machine, a graphics library for calling a function of said geometry processing library in the case of a drawing command for said first machine and, in the case of a graphics context control command and a structure-associated command from said first machine, sending data to said remote access process library;

wherein a function is called from said geometry processing library in the case of a direct drawing command in a local case in which a client and a server operate on the first machine in order to eliminate use of a communication process; and wherein said structure for hierarchically holding graphics commands is held in one area in said first machine.

7. A graphics drawing method according to claim 6, wherein current graphics context information is accessed only by said geometry processing library.

8. A graphics drawing method as defined in claim 6, further comprising confirming whether another processing operation for the same predetermined graphics context has been completed when a function of said geometry processing library is called from said graphics library.

9. A graphics drawing method according to claim 6, wherein the graphics resource is not held in the second machine.

10. In a graphics drawing method based on a client server model including first and second machines operating together using a communication process, said client server model employing a graphics standardization specification PEX, the step of, if a drawing command operates in a local case in which a client and a server operate on the first machine, directly calling a function of a geometry processing library in the first machine from a graphics library in the first machine without using the communication process, thereby enhancing drawing speed, wherein a graphics context and a structure to be used in said PEX specification are held in one area in the first machine.

11. A graphics drawing method as defined in claim 10, further comprising confirming whether another processing operation for a predetermined drawing area has been completed when a function of said geometry processing library is called from said graphics library.

12. A graphics drawing method according to claim 10, wherein the graphics resource is not held in the second machine.

13. In a graphics drawing apparatus operating on a computer system based on a client server model including first and second machines operating together using a communication process, said client server model employing a graphics standardization specification PEX, said apparatus further comprising means for directly calling a function of a geometry processing library in the first machine from a graphics library in the first machine to eliminate use of the communication process, thereby enhancing drawing speed when a drawing command operates in a local case in which a client and a server operate on the first machine, wherein a graphics context and a structure to be used in said PEX specification are held in one area in the first machine.

14. A graphics drawing apparatus as defined in claim 13, further including confirmation means for confirming whether another processing operation for the same predetermined graphics context has been completed, when a function of said geometry processing library is called from said graphics library.

15. A graphics drawing apparatus according to claim 13, wherein the graphics resource is not held in the second machine.

16. A computer system based on a client server model having editing and drawing commands for a structure for hierarchically holding graphics commands, control drawing commands for a graphics context for holding a set of graphics attributes and environments, and direct drawing commands, comprising:

a remote access processing library in a first machine for performing a communication process on a drawing command coming from a second machine;

a structure and graphics context control library in said first machine for performing graphics context control and structure control;

a geometry processing library in said first machine for performing a graphics process;

a graphics library in said first machine for calling a function from said geometry processing library in the case of a drawing command for said first machine and, in the case of a graphics context control command a structure-associated command from said first machine, for sending data to said remote access processing library; and calling means for directly calling a function of said geometry processing library from said graphics library if a drawing command operates in a local case in which a client and a server operate on the first machine, wherein said graphics context and said structure for hierarchically holding drawing commands are held in one area in said first machine.

17. A computer system as defined in claim 16, further comprising confirmation means for confirming whether another processing operation for a predetermined drawing area has been completed when directly calling a function of said geometry processing library from said graphics library.

18. A computer system as defined in claim 16, wherein current graphics context information is accessed only by said geometry processing library.

19. A computer system according to claim 16, wherein the graphics resource is not held in the second machine.

20. A computer system based on a client server model comprising:

a first machine including a first application, a first graphics library coupled to said first application, a remote access process library coupled to said first graphics library via a first path, a structure and graphics context control library coupled to said remote access process library, a geometry processing library coupled to said first graphics library via a second path, and also coupled to said remote access process library and said structure and graphics context control library, and a graphics rendering processor coupled to said geometry processing library, and including means for using information from the geometry processing library to generate a graphics display in said first machine;

a second machine including a second application and a second graphics library, wherein said second graphics library is coupled to said remote access processing library through a third path, wherein, a remote client-server mode, a graphics command from said second application in said second machine is transferred to said second graphics library, and then transferred to said remote access processing library using a communication process through said third path, and wherein, in a local stand alone mode, said first graphics library includes means for determining whether a command from the first application can be directly applied to call a function from the geometry processing library to perform graphics processing in said first machine without using a communication process, and means for determining whether a command from said first application is a command to edit said structure or said graphics context, and, in such a case, using a routine for a remote case for controlling the structure or graphics context with a communication process.

21. A computer system according to claim 20, wherein said structure and graphics context are held in one area in said first machine and are not held in said second machine.

22. A computer system according to claim 20, wherein said structure comprises a graphics standardization specification PEX for hierarchically holding graphics commands.

23. A computer system according to claim 20, wherein said system further includes a current graphics context table coupled to said geometry processing library.

24. A graphics drawing method based on a client server model comprising the steps of:

sharing a graphic resource, which includes a graphic context library and a geometry library, by one application in a first machine with another application in a second machine, wherein the graphic context library and geometry library are located only in the first machine;

determining whether a graphics drawing processing in said one application is a local case, in which case a graphics command of said graphics drawing processing is sent directly from said one application along a first path to a graphics rendering processor in said first machine without communication processing, or a remote case, in which case said graphics command is sent from said one application along a second path, including communication processing, to the graphics rendering processor in said first machine;

performing said graphics drawing processing by said one application with said graphic context library and said geometry library in said local case;

sending said graphics command from said one application to a server process for said communication processing along the second path in said first machine to perform said graphics drawing processing in said remote case; and performing said graphics drawing processing by said server process for said communication processing with said graphic context library and said geometry library in said remote case, wherein both said graphics context library and said geometry library located only in the first machine are shared for the graphics drawing processing regardless of whether the graphics drawing processing is performed in said local case or said remote case.

25. A graphics drawing system based on a client server model comprising:

means for sharing a graphic resource, which includes a graphic context library and a geometry library, by one application in a first machine with another application in a second machine, wherein the graphic context library and geometry library are located only in the first machine;

means for determining whether a graphics drawing processing in said one application is a local case, in which case a graphics command of said graphics drawing processing is sent directly from said one application along a first path to a graphics rendering processor in said first machine without communication processing, or a remote case, in which case said graphics command is sent from said one application along a second path, including communication processing, to the graphics rendering processor in said first machine;

means for performing said graphics drawing processing by said one application with said graphic context library and said geometry library in said local case;

means for sending said graphics command from said one application to a server process for said communication processing along the second path in said first machine to perform said graphics drawing processing in said remote case; and means for performing said graphics drawing processing by said server process for said communication processing with said graphic context library and said geometry library in said remote case, wherein both said graphics context library and said geometry library located only in the first machine are shared for the graphics drawing processing regardless of whether the graphics drawing processing is performed in said local case or said remote case.

* * * * *